United States Patent

Laughlin

[11] Patent Number: 5,555,327
[45] Date of Patent: *Sep. 10, 1996

[54] FRUSTRATED TOTAL INTERNAL REFLECTION DEVICE

[76] Inventor: Richard H. Laughlin, 1906 Campbell Trail, Richardson, Tex. 75082

[*] Notice: The term of this patent shall not extend beyond the expiration date of Pat. No. 5,221,987.

[21] Appl. No.: 480,144

[22] Filed: Jun. 7, 1995

[51] Int. Cl.⁶ .................................. G02B 5/12
[52] U.S. Cl. .................. 385/16; 385/18; 385/36; 359/222
[58] Field of Search ............... 385/16, 18, 146, 385/147, 36, 12; 359/222, 529

[56] References Cited

U.S. PATENT DOCUMENTS

| | | | |
|---|---|---|---|
| 3,649,105 | 3/1972 | Treuthart | 359/222 |
| 4,249,814 | 2/1981 | Hull et al. | 354/154 |
| 4,303,302 | 12/1981 | Ramsey et al. | 385/16 |
| 4,613,203 | 9/1986 | Proetel et al. | 359/1 |
| 4,657,339 | 4/1987 | Fick | 385/16 |
| 4,714,326 | 12/1987 | Usui et al. | 359/222 |
| 4,738,500 | 4/1988 | Grupp et al. | 359/199 |
| 4,790,621 | 12/1988 | Calaby et al. | 385/21 |
| 4,796,263 | 1/1989 | Rampolla | 372/10 |
| 4,814,600 | 3/1989 | Bergstrom | 250/221 |
| 4,838,637 | 6/1989 | Torok et al. | 350/96 |
| 4,927,225 | 5/1990 | Levinson | 385/16 |
| 5,031,987 | 7/1991 | Norling | 385/12 |
| 5,199,088 | 3/1993 | Magel | 385/18 |
| 5,208,880 | 5/1993 | Riza et al. | 385/18 |
| 5,221,987 | 6/1993 | Laughlin | 359/222 |
| 5,444,801 | 8/1995 | Laughlin | 385/16 |

Primary Examiner—John D. Lee
Assistant Examiner—Phan T. H. Palmer
Attorney, Agent, or Firm—Baker & Botts, L.L.P.

[57] ABSTRACT

A device (10) for processing an optical signal (28) is provided. The device includes a refractor (12) having first (34) and second (36) ends and having a reflecting surface (16) for reflecting the optical signal (28) by total internal reflection. The device also includes a switchplate (20) having first (44) and second (46) ends, a contact surface (22) for contacting the refractor (12), and wherein one end (44 or 46) of the switchplate (20) is secured to the refractor (12). An actuator (40) provides a force that moves the switchplate (20) with respect to the refractor (12). The switchplate's contact surface (22) can frustrate the total internal reflection of the optical signal (28) by the refractor's reflecting surface (16) when the contact surface (22) of the switchplate (20) is in proximal contact with the refractor (12).

32 Claims, 3 Drawing Sheets

5,555,327

FRUSTRATED TOTAL INTERNAL REFLECTION DEVICE

TECHNICAL FIELD OF THE INVENTION

This invention relates in general to the field of frustrated total internal reflection (FTIR) devices, and more particularly, to an improved design for FTIR devices providing enhanced operation.

CROSS REFERENCE TO RELATED APPLICATIONS

This application relates to pending U.S. patent application Ser. No. 08/251,837, now U.S. Pat. No. 5,444,801 entitled Apparatus for Switching Optical Signals and Method of Operation, filed May 27, 1994.

BACKGROUND OF THE INVENTION

U.S. Pat. No. 5,221,987, issued to Laughlin, entitled FTIR Modulator, discloses an apparatus that employs FTIR to modulate and switch beams of light or optical signals. U.S. Pat. No. 5,211,987 is incorporated by reference for all purposes herein.

U.S. Pat. No. 5,221,987, discloses a method of developing frustrated total internal reflection by moving two surfaces into and out of contact with one another. To achieve total frustration of total internal reflection contact of two surfaces must be made. Once these surfaces are brought into contact an electrostatic "bond" is formed between the surfaces. To later separate the surfaces requires breaking the electrostatic bond. Overcoming the bond may add to the difficulty and time required in separating these two surfaces. U.S. Pat. No. 5,221,987 taught a method of bending one the surfaces in one plane to address this problem.

The inventor of the inventions disclosed in U.S. Pat. No. 5,221,987 has developed several improvements to the FTIR device disclosed therein that are the subject of this present application.

SUMMARY OF THE INVENTION

In accordance with the present invention, an improved FTIR device is provided that substantially eliminates or reduces disadvantages and problems associated with previously developed FTIR devices.

One aspect of the present invention provides a device for processing an optical signal having a refractor with first and second ends and having a reflecting surface for reflecting the optical signal by total internal reflection. The devices also includes a switchplate having first and second ends and a contact surface for contacting the refractor. One end of the switchplate is secured to the refractor. Additionally, the device includes an actuator for providing a force that moves the switchplate with respect to the refractor. The switchplate's contact surface can frustrate the total internal reflection of the optical signal by the refractor's reflecting surface when the contact surface of the switchplate is in proximal contact with the refractor.

Another aspect of the present invention provides a device for processing an optical signal having a refractor with first and second ends and having a reflecting surface for reflecting the optical signal by total internal reflection. The device also includes a switchplate having first and second ends, a contact surface for contacting the refractor, and a reflective surface for reflecting the optical signal. The second end of the switchplate is secured to the refractor proximal to the refractors second end. Additionally, the device includes a first actuator for providing a force that moves the switchplate with respect to the refractor and a second actuator for moving the switchplate in a direction opposite to the first actuator. The switchplate's contact surface can frustrate the total internal reflection of the optical signal by the refractor's reflecting surface when the contact surface of the switchplate is in proximal contact with the refractor so that the optical signal enters the switchplate. The switchplate's reflective surface can reflect the optical signal.

Yet another aspect of the present invention provides a method for forming a device for processing an optical signal. The method includes the steps of forming a refractor having first and second ends and having a reflecting surface for reflecting the optical signal by total internal reflection. The method also includes forming a switchplate having first and second ends and a contact surface for contacting the refractor. Additionally, the method includes securing one end of the switchplate to the refractor and providing an actuator that provides a force that moves the switchplate with respect to the refractor. The switchplate's contact surface is operable to frustrate the total internal reflection of the optical signal by the refractor's reflecting surface when the contact; surface of the switchplate is in proximal contact with the refractor.

The present invention provides numerous technical advantages. The present invention provides all the technical advantages in U.S. Pat.. No. 5,221,987 as well as the advantages of U.S. patent application Ser. No. 08/251,837 now U.S. Pat. No. 5,444,801, which is expressly incorporated by reference herein for all purposes.

Additionally, the present invention provides a technical advantage of a more sturdy structure over previously developed FTIR devices. Since the switchplate of the present FTIR device is secured to the refractor, damage to either the switchplate or refractor by scratching or abrasion through lateral movement of the switchplate with respect to the refractor is minimized.

An additional technical advantage of the present invention is the increased speed at which the switchplate and refractor may be moved with respect to one another over previously developed FTIR devices.

Yet another technical advantage of the present invention is that it achieves higher reliability over prior FTIR devices.

Another technical advantage of the present FTIR device is that it may be manufactured at reduced cost over prior devices.

BRIEF DESCRIPTION OF DRAWINGS

For a more complete understanding of the present invention and advantages thereof, reference is now made to the following description taken in conjunction with the accompanying drawings in which like reference numbers indicate like features and wherein.

DETAILED DESCRIPTION OF THE INVENTION

Preferred embodiments of the present invention are illustrated in the FIGUREs, like numerals being used to refer to like corresponding parts of the various drawings.

Figure 1:
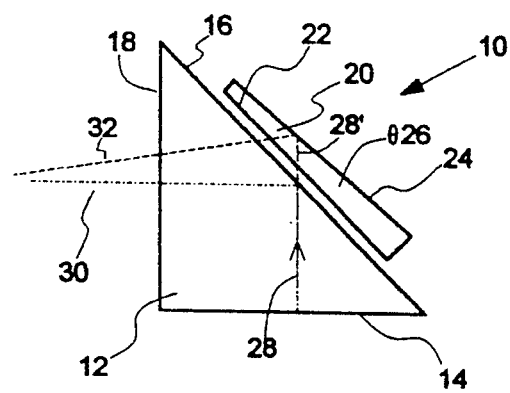
FIG. 1 is a schematic diagram illustrating the reflection of an optical signal in the FTIR device of the present invention.

FIG. 1 shows FTIR device 10 of the present invention. FTIR device 10 includes first refractor 12, hereinafter refractor 12, which is a right angle prism in the embodiment shown in FIG. 1. Refractor 12 may be formed from many suitable refractive materials and may have many configurations without deviating from the inventive concepts of the present invention. First refractor 12 in FIG. 1 has three surfaces, including first or input surface 14, second or reflecting surface 16, and third or output surface 18. In three dimensions, first, second, and third surfaces are generally, but not necessarily, perpendicular with respect to one another.

FTIR device 10 also includes second refractor or switchplate 20 having contact surface 22 and reflective surface 24. Switchplate 20 may be formed from many suitable refractive materials and may have many configurations without deviating from the inventive concepts of the present invention. Reflective surface 24 of switch plate 20 is at bias angle θ 26 with respect to contact surface 22. The reflectivity of reflective surface 24 may be caused by total internal reflection or by reflective material. It is noted that reflective surface 24 of switchplate 20 may be non-reflective or optically absorbing.

The theory behind and operation of FTIR device 10 is fully described in U.S. Pat. No. 5,211,987 and U.S. patent application Ser. No. 08/251,837 now U.S. Pat. No. 5,444, 801, and need not be repeated here for an understanding of the present invention. A summary of the operation of FTIR device 10, however, will be provided.

Switchplate 20 is shown in FIG. 1 as removed from refractor 12. In this position, input optical beam 28 enters refractor 12 at input surface 14. Beam 28 travels in refractor 12 until it reaches reflecting surface 16. Beam 28 is reflected at reflecting surface 16 by total internal reflection (TIR) in accordance with Snell's law as described in U.S. Pat. No. 5,221,987 and U.S. patent application Ser. No. 08/251,837 now U.S. Pat. No. 5,444,801 forming primary output beam 30 that exits refractor 12 at output surface 18.

In order to change the angle of output beam 30, and in turn, the location that output beam 30 exits output surface 18, switchplate 20 is brought into proximal contact with refractor 12. Bringing contact surface 22 of switchplate 20 into contact with refractor 12 will be described in more detail hereinafter. Bringing contact surface 22 of switchplate 20 into proximal contact with reflecting surface 16 of refractor 12 frustrates the total internal reflection in refractor 12. This causes input beam 28' to travel into switchplate 20. Beam 28' is reflected at reflective surface 24 of switchplate 20 as secondary output beam 32. The reflection of beam 28' at reflective surface 24 may or may not be by total internal reflection. As shown in FIG. 1, because optical beam 28' travels into switchplate 20 before reflection at reflective surface 24, secondary output beam 32 may exit output surface 18 of refractor 12 at a different location than primary output beam 30. Where secondary output beam 32 exits output surface 18 with respect to primary output beam 30 is a function of bias angle θ 26 of switchplate 20 as is described in pending U.S. patent application Ser. No. 08/251,837 now U.S. Pat. No. 5,444,801. Alternatively, by varying the thickness of switchplate 20 and angle θ 26, primary output beam 30 and secondary output beam 32 can intersect at output surface 18.

Therefore, an input optical signal to FTIR device 10 of FIG. 1, can be processed by switching or modulating the signal. This processing is achieved by moving switchplate 20 with respect to refractor 12.

Figure 2:
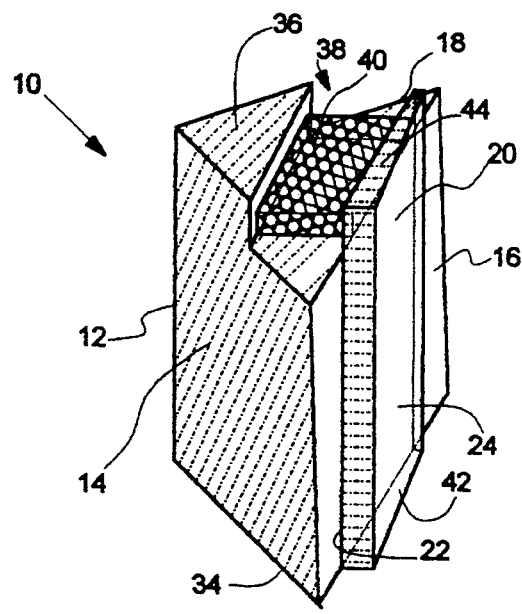
FIG. 2 depicts a perspective view of one embodiment of the FTIR device of the present invention.

FIG. 2 is a perspective view of one embodiment of FTIR device 10 of FIG. 1. The view of FIG. 2 shows bottom surface 34 and top surface 36 of refractor 12. Formed in top surface 36 of refractor 12 is notch 38. Positioned in notch 38 is actuator 40. In one embodiment of FTIR device 10, actuator 40 is a piezo-electrical device that responds to a control signal (not explicitly shown). The view of FIG. 2 also shows switchplate 20 having first end 42 and second end 44. First end 42 of switchplate 20 is secured to refractor 12. First end 42 of switchplate 20 may be secured to refractor 12 by any suitable mechanism including bonding or clamping. Actuator 40 is disposed in notch 38 of refractor 12 between refractor 12 and second end 44 of switchplate 20.

In the view shown in FIG. 2, switchplate 20 is in contact with refractor 12. As previously described in connection with discussions relating to FIG. 1, in this position a signal entering refractor 12 through input surface 14 will travel in refractor 12 and into switchplate 20 where it will be reflected at reflective surface 24 of switchplate 20. This signal will then exit at output surface 18 of refractor 112.

To change the path of the optical signal, actuator 40 is activated. Activating actuator 40 causes it to expand so that second end 44 of switchplate 20 moves away from refractor 12. Once actuator 40 supplies sufficient force it bends second end 44 causing peel forces to break the electrostatic forces between contact surface 22 of switchplate 20 and reflecting surface 16 of refractor 12. This causes separation between reflecting surface 16 of refractor 12 and contact surface 22 of switchplate 20. Switchplate 20 has a degree of elasticity to it and the initial separation occurring between switchplate 20 and refractor 12 is near actuator 40. This separation propagates towards first end 42 of switchplate 20 where switchplate 20 is attached to refractor 12. Actuator 40, therefore, causes switchplate 20 to peel away from refractor 12 rather than sheering away from refractor 12. This minimizes the amount of force that actuator 40 must supply to move switchplate 20 with respect to actuator 12, minimizes the instantaneous contact area between refractor 12 and switchplate 20, and also minimizes the time necessary to move switchplate 20 with respect to refractor 20.

Once switchplate 20 is removed from refractor 12 a sufficient distance, approximately two times the wavelength (λ) of the beam in FTIR device 10, then input optical beam 28 reflects by total internal reflection at reflecting surface 16 of refractor 12. This causes primary output beam 30 to exit refractor 12 at surface 18 at a new location as was previously described. Deactivating actuator 40 causes it to contract so that switchplate 20 returns to its at-rest position against refractor 12.

Additionally, controlling the amount of expansion provided by actuator 40 in turn controls the separation between switchplate 20 and refractor 12. This allows FTIR device 10 to be used for either switching or modulating the signal input to FTIR device 10.

Attaching switchplate 20 to refractor 12 at first end 42 prevents virtually all lateral movement of switchplate 20 with respect to refractor 12. This prevents abrasions or contusions from forming on reflecting surface 16 of refractor 12 or contact surface 22 of switchplate 20. Abrasions or contusions will affect the efficiency of the total internal reflection at these surfaces and also affect the proximal contact achievable between these surfaces.

Figure 3:
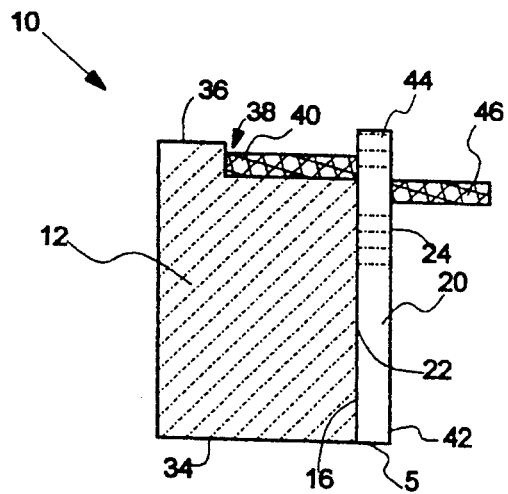
FIG. 3 illustrates a side cross-sectional view of the FTIR device of FIG. 2.

FIG. 3 is a cross-sectional view of FTIR device 10 of FIG. 2 with additional second actuator 46. Second actuator 46 may also be a piezo-electrical device that is responsive to a control signal (not explicitly shown) that is secured to a physical reference (also not explicitly shown). Second actuator 46 provides a driving force to move switchplate 20 into contact with refractor 12. Activating actuator 40 and deactivating actuator 46 moves switchplate 20 away from refractor 12. To return switchplate 20 back into contact with refractor 12, actuator 40 is deactivated and second actuator 46 is activated. Using both actuators to drive switchplate 20 increases the speed at which switchplate 20 can be moved with respect to refractor 12. This allows FTIR device 10 to "switch" faster then previously developed devices.

It is noted that there may be applications of FTIR device 10 where it may be desirable to move switchplate 20 away from refractor 12 a distance sufficient so that a beam traveling in refractor 12 is reflected partially at reflecting surface 16 of refractor 12 and partially at reflective surface 24 of switchplate 20. FTIR device 10 operating in this mode provides a variable beam splitter or attenuator function. When this function is desired both actuators 38 and 46 can be activated a sufficient amount to control the exact spacing between refractor 12 and switchplate 20.

It is noted that second actuator 46 may be a spring to provide a preloaded stress to switchplate 20 with respect to refractor 12. The spring may be embodied in a cylindrical spring or in a belleville spring. Alternatively, actuator 40 may be embodied in a spring while actuator 46 is embodied in a piezo-electrical device. Either of these configurations provide enhanced switching speeds over previously developed FTIR devices.

Figure 4:
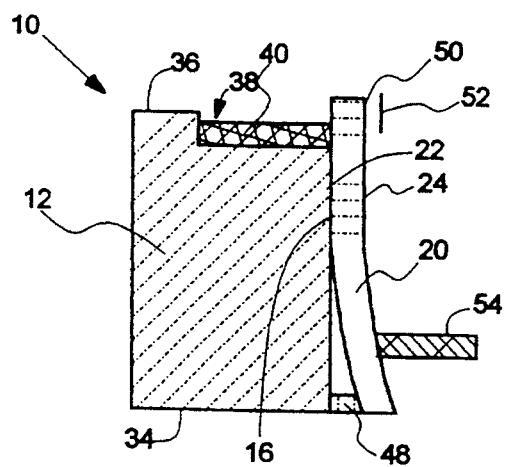
FIG. 4 provides a side cross-sectional view of an alternate embodiment of the present inventive FTIR device having a prestressed switchplate.

FIG. 4 is a cross-sectional view of an alternate embodiment of FTIR device 10. Switchplate 20 is attached at first end 42 to refractor 12 by spacer 48. Switchplate 20 is attached to refractor 12 at first end 42 by bonding or clamping such that switchplate 20 is bent or deflected with respect to refractor 12. The deflection of switchplate 20 provides a force that helps maintain contact surface 22 in proximal contact with reflecting surface 16 of refractor 12. This helps minimize the time necessary for switchplate 20 to return to proximal contact with refractor 12 when actuator 40 is deactivated. This embodiment shown in FIG. 4 can also eliminate the need for second actuator 46 in FIG. 3 or other preloading devices to return switchplate 20 into proximal contact with refractor 12 when actuator 40 is deactivated.

A further enhancement that may be provided to FTIR device 10 is also shown in FIG. 4. Conductive element 50 may be placed on switchplate 20 near second end 44. By placing a second conductive reference 52 near conductive element 50 a capacitor is formed. Second conductive reference 52 should be at a distance that is just greater than the displacement of switchplate 20 when actuator 40 is activated. By measuring the value of the capacitor formed by element 50 and reference 52, the positioning of switchplate 20 can be more accurately controlled. This may be particularly helpful when using FTIR device 10 as a variable splitter or modulator of an optical beam.

Additionally, FTIR device 10 in FIG. 4 may also include preload 54. Preload 54 may be embodied in a clamp or screw. Preload 54 provides a force on switchplate 20 with respect to refractor 12 such that switchplate 20 is deformed in a leaf-spring configuration forcing switchplate 20 against refractor 12.

Figure 5:
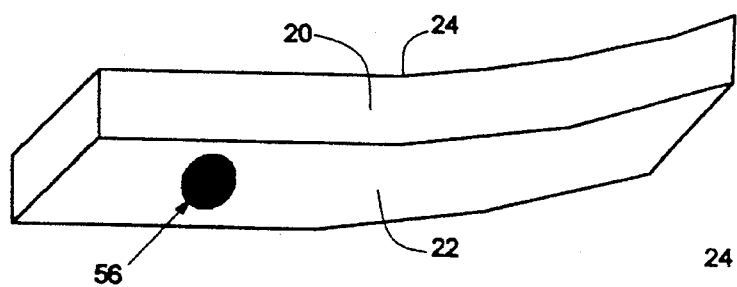
FIG. 5 shows a bottom perspective view of a switchplate having a contact area for use with the present FTIR device.

FIG. 5 is a bottom view of an alternate embodiment of switchplate 20 of FTIR device 10. Even with a super polish on or cleaning of refractor 12 and switchplate 20, however, the surface roughness of contact surface 22 and reflecting surface 16 may be on the order $10^{-1}$ to $10^{-2}$ microns. This surface roughness requires a sufficient pressure be applied to these surfaces to cause an elastic deformation of the abnormalities such that the surfaces may be brought into contact. Since pressure is a force per unit area, the force required to bring contact surface 22 into proximal contact with reflecting surface 16 can be reduced by reducing contact area 56 of contact surface 22. The beam of light in FTIR device 10 will enter switchplate 20 at contact area 56.

Reducing the size of contact area 56 may be achieved by removing a very small amount, nominally two microns, of contact surface 22 such that contact of switchplate 20 with respect to refractor 12 is limited to contact area 56. Contact area 56 may have many shapes and is not limited to that depicted in FIG. 5. Contact area 56 may be formed by etching contact surface 22 of switchplate 20. Additionally, it is recognized that there are many ways to form a contact area 56, such as by adding a contact shim to reflecting surface 16 of refractor 12 or contact surface 22 of switchplate 20, and then etching the shim to the desired shape.

Figure 6:
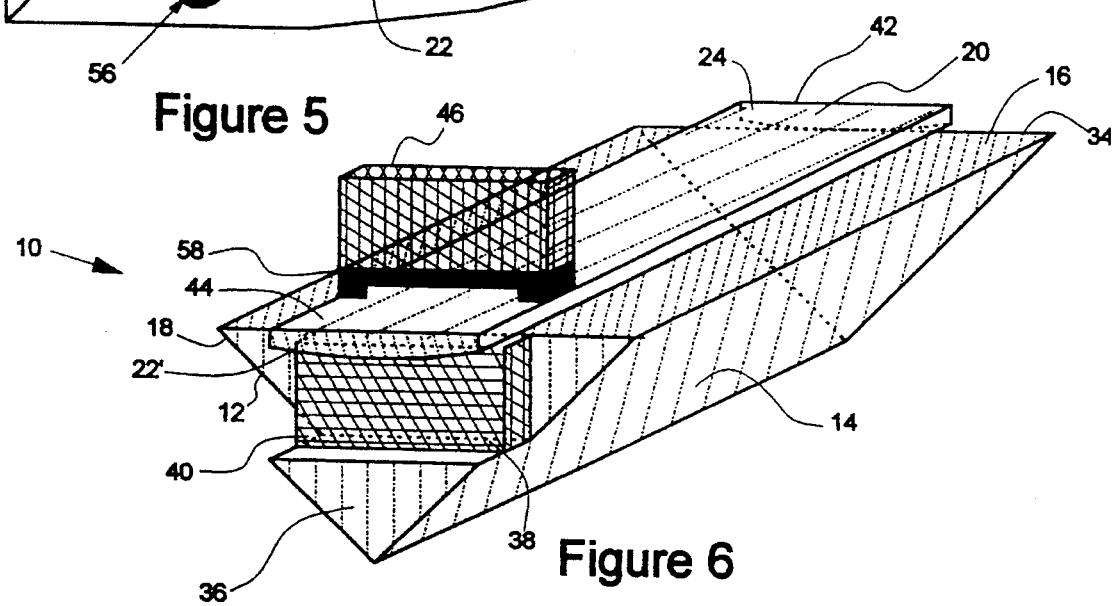
FIG. 6 shows a perspective view of another embodiment of the FTIR device of the present invention.

FIG. 6 shows an end perspective view of FTIR device 10 and illustrates an alternate embodiment of device 10. In discussions relating to the previous FIGUREs, various methods were described on how to bring contact surface 22 of switchplate 20 into proximal contact with reflecting surface 16 of refractor 12. FIG. 6 illustrates another embodiment for bringing switchplate 20 into contact with refractor 12. In the embodiment of FTIR device 10 in FIG. 6 contact surface 22' of switchplate 20 is convex. The curve of contact surface 22' produces spacing on the edges of switchplate 20 with respect to refractor 12 on the order of a few wavelengths of the optical beam traveling in FTIR device 10. To depress switchplate 20 having curved contact surface 22', bridge 58 may be required with the use of second actuator 46. The legs of bridge 58 on the edges of switchplate 20 help compress the convex surface of contact surface 22' into contact with reflecting surface 16 of refractor 12. When actuator 46 forces bridge 58 against switchplate 20 the center of surface 22' first comes into contact with reflective surface 16. This reduced area increases the pressure, force per unit area, applied to the contact points between switchplate 20 and refractor 12, and as the force continues switchplate 20 flattens out and conforms to contact surface 16.

Figure 7:
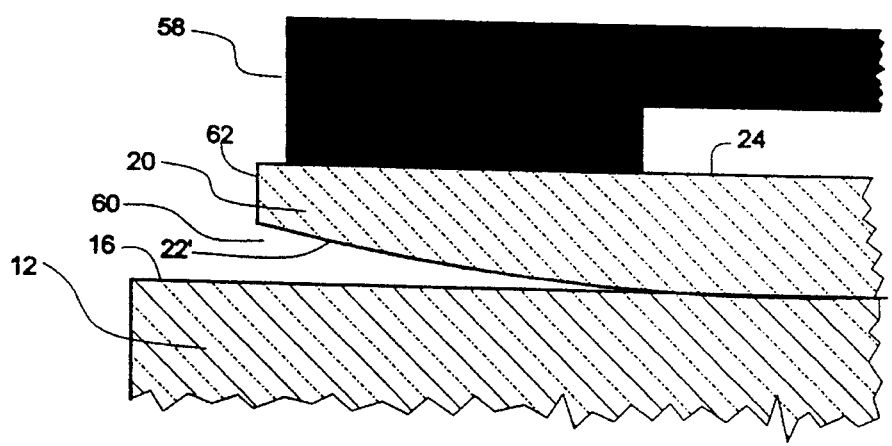
FIG. 7 provides a cross-sectional view of a portion of the FTIR device in FIG. 6.

FIG. 7 shows a cross-sectional expanded view of the alternate embodiment of FTIR device 10 in FIG. 6. FIG. 7 more clearly shows spacing 60 between reflecting surface 22' of switchplate 20 and reflecting surface 16 of refractor 12. When the force from second actuator 46 is released the edges of switchplate 20 as represented by edge 62 in FIG. 7 return to their original shape breaking the electrostatic contact forces between switchplate 20 and refractor 12. This allows actuator 40, as shown in FIGS. 6 and 7, to use less force to separate switchplate 20 from refractor 12 and also to separate them more rapidly. When second actuator 46 is activated to return contact surface 22' of switchplate 20 into proximal contact with reflecting surface 16 of refractor 12, it applies force to bridge 58 that pushes on the opposing edges of switchplate 20. Switchplate 20 moves towards refractor 12 making contact at the center or apex of contact surface 22'. Second actuator 46 initially produces a great force over a small area thereby deforming contact surface 22' such that the electrostatic forces can take effect at the contact point. Once the electrostatic contact has been made between contact surface 22' of switchplate 20 and reflecting surface 16 of refractor 12, then the electrostatic forces tend to spread in a self-initiating manner causing greater contact of switchplate 20 with respect to refractor 12.

As actuator 46 continues to apply force to bridge 16, the forces on switchplate 20 cause it to deform and flatten completely against refractor 12. Resulting in proximal contact between surface 22' of switchplate 20 and reflecting surface 16 of refractor 12. This results in a more complete contact of switchplate 20 to refractor 16 and therefore results in greater frustrated total internal reflection of a beam in device 10. This allows FTIR device 10 to be a more efficient optical switch, modulator, or splitter. Convex contact surface 22' of switchplate 20 may be formed by many methods, including, for example, grinding contact surface 22' of switchplate 20 to the desired convex surface. Alternatively, convex contact surface 22' may be formed by placing a convex refracting element on only a portion of contact surface 22 of switchplate 20.

Figure 8A:
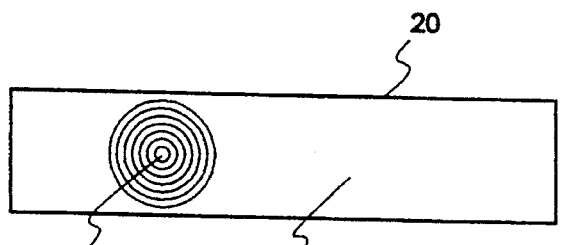
FIGS. 8A and 8B depict a switchplate of the present FTIR device incorporating a lens into the switchplate.
Figure 8B:
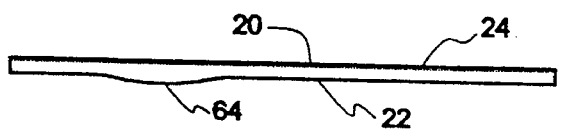

FIG. 8A illustrates one method for forming convex contact surface 22' of FIGS. 6 and 7. FIG. 8A is a bottom view of switchplate 20 having convex refracting element 64 thereon. Convex refracting element 64 covers only a portion of contact surface 22 of switchplate 20 and provides convex contact surface 22' of FIGS. 6 and 7. Convex refracting element 64 may be formed in contact surface 22 by many methods, including, for example, grinding, polishing, or etching contact surface 22, or alternatively, may be a separate convex refracting element 64 that is bonded to surface 22 of switchplate 20 by an appropriate optically transparent agent. FIG. 8B shows a side view of switchplate 20 of FIG. 8A having convex refracting element 64.

Figure 9:
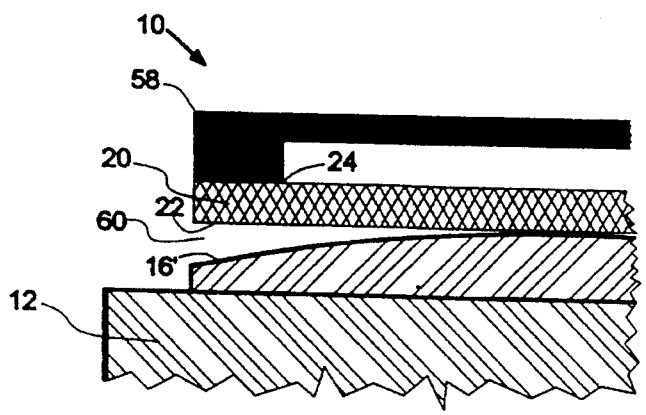
FIG. 9 depicts a cross-sectional view of a portion of an alternate embodiment of the FTIR device of the present invention.

FIG. 9 illustrates a cross-sectional expanded view of an alternate embodiment of FTIR device 10 for achieving the advantages of a curved contact surface between switchplate 20 and refractor 12. In the embodiment of FIG. 9, the curved surface is formed in reflecting surface 16' of refractor 12. FTIR device 10 of FIG. 9 operates substantially in the same way as FTIR device 10 in FIGS. 6 and 7. Because reflecting surface 16' is curved with respect to contact surface 22 of switchplate 20, the amount of force required to bring the surfaces into contact with one another and to later separate the surfaces is greatly reduced over prior known FTIR devices.

Forming convex surface 16' on reflecting surface 16 of refractor 12 may be accomplished by many methods. Reflecting surface 16, for example, can be ground to form the convex surface. Alternatively, the convex surface may be formed by placing a convex refractive element on reflecting surface 16 of refractor 12.

Figure 10A:
FIGS. 10A and 10B depict a refractor of the present FTIR device incorporating a lens into the surface of the refractor.
Figure 10B:
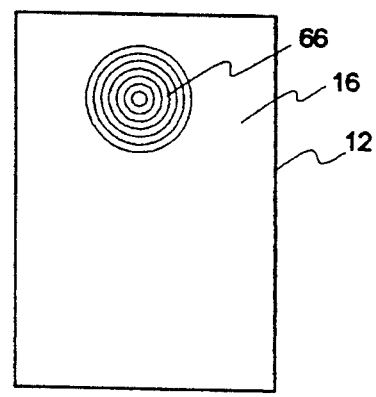

FIGS. 10A and 10B show the formation of convex reflecting surface on refractor 12 through the use of convex refracting element 66 that is placed on reflecting surface 16'. FIG. 10A is a side cross-sectional view of refractor 12 showing convex refracting a typical element 66 on reflecting surface 16 of refractor 12. Axial distance between the apex and the edge for convex refraction element 66 is nominally three microns. FIG. 10B shows a top view of refractor 12 having a convex surface formed by lens 66.

The present FTIR device provides several technical advantages. Because lateral movement of the switchplate with respect to the refractor is eliminated the opportunity for introducing abrasion to the contacting surfaces is minimized. Additionally, the use of multiple actuator or biasing forces along with attaching one end of the switchplate to the refractor allows for achieving faster switching speeds in the FTIR device.

Although the present invention has been described in detail, it should be understood that various changes, substitutions, and alterations can be made hereto without departing from the spirit and scope of the invention as defined by the appended claims.

What is claimed is:

1. A device for processing an optical signal comprising:
   a refractor having first and second ends and having a reflecting surface for reflecting the optical signal by total internal reflection;
   a switchplate having first and second ends, a contact surface for contacting the refractor, and wherein one end of the switchplate is secured to the refractor;
   an actuator for providing a force that moves the switchplate with respect to the refractor; and
   wherein the switchplate's contact surface is operable to frustrate the total internal reflection of the optical signal by the refractor's reflecting surface when the contact surface of the switchplate is in proximal contact with the refractor.

2. The device of claim 1 wherein the switchplate further comprises a reflective surface for reflecting the optical signal.

3. The device of claim 1 further comprising a second actuator for moving the switchplate in a direction opposite to the first actuator.

4. The device of claim 3 wherein one of the first and second actuator comprises a spring for providing a force opposite the force supplied by the other actuator.

5. The device of claim 3 wherein the first and second actuators are operable to vary the spacing between the refractor and switchplate.

6. The device of claim 1 wherein the actuator is operable to controllably vary the spacing between the refractor and switchplate.

7. The device of claim 1 further comprising a spacer between the switchplate and the refractor for causing the switchplate to be biased against the refractor.

8. The device of claim 1 further comprising a preload for biasing the switchplate against the refractor.

9. The device of claim 1 wherein the contact surface of the switchplate further comprises a contact area for contacting the reflecting surface of the refractor, and wherein the contact area is a portion of the total area of the contact surface.

10. The device of claim 1 wherein at least one of the contact surface of the switchplate and the reflecting surface of the refractor is convex.

11. The device of claim 1 further comprising a convex refracting element on the contact surface of the switchplate for contacting the reflecting surface of the refractor.

12. The device of claim 1 further comprising a convex refracting element on the reflecting surface of the refractor for contacting the contact surface of the switchplate.

13. The device of claim 1 wherein the refractor is a prism.

14. The device of claim 1 wherein the actuator is a piezo-electrical device.

15. The device of claim 1 further comprising:

a conductive element on the switchplate;

a conductive reference displaced from the conductive element; and wherein the conductive element and reference form a capacitor, the value of which represents the spacing between the switchplate and refractor.

16. A device for processing an optical signal comprising:

a refractor having first and second ends and having a reflecting surface for reflecting the optical signal by total internal reflection;

a switchplate having first and second ends, a contact surface for contacting the refractor, and a reflective surface for reflecting the optical signal, and wherein the second end of the switchplate is secured to the refractor proximal to the refractors second end;

a first actuator for providing a force that moves the switchplate with respect to the refractor;

a second actuator for moving the switchplate in a direction opposite to the first actuator; and wherein the switchplate's contact surface is operable to frustrate the total internal reflection of the optical signal by the refractor's reflecting surface when the contact surface of the switchplate is in proximal contact with the refractor so that the optical signal enters the switchplate, and wherein the switchplate's reflective surface is operable to reflect the optical signal.

17. The device of claim 16 further comprising a spacer between the switchplate and the refractor for causing the switchplate to be biased against the refractor.

18. The device of claim 16 further comprising a preload for biasing the switchplate against the refractor.

19. The device of claim 16 wherein the contact surface of the switchplate further comprises a contact area for contacting the reflecting surface of the refractor, and wherein the contact area is a portion of the total area of the reflecting surface.

20. The device of claim 16 wherein at least one of the contact surface of the switchplate and the reflecting surface of the refractor is convex.

21. The device of claim 16 further comprising a convex refracting element on the contact surface of the switchplate for contacting the reflecting surface of the refractor.

22. The device of claim 16 further comprising a convex refracting element on the reflecting surface of the refractor for contacting the contact surface of the switchplate.

23. The device of claim 16 wherein the actuators are piezo-electrical devices.

24. The device of claim 16 further comprising:

a conductive element on the switchplate;

a conductive reference displaced from the conductive element; and wherein the conductive element and reference form a capacitor, the value of which represents the spacing between the switchplate and refractor.

25. A method for forming a device for processing an optical signal, the method comprising the steps of:

forming a refractor having first and second ends and having a reflecting surface for reflecting the optical signal by total internal reflection;

forming a switchplate having first and second ends and a contact surface for contacting the refractor;

securing one end of the switchplate to the refractor;

providing an actuator that provides a force that moves the switchplate with respect to the refractor; and wherein the switchplate's contact surface is operable to frustrate the total internal reflection of the optical signal by the refractor's reflecting surface when the contact surface of the switchplate is in proximal contact with the refractor.

26. The method of claim 25 further comprising the step of positioning a spacer between the switchplate and the refractor that causes the switchplate to be biased against the refractor.

27. The method of claim 25 further comprising the step of biasing the switchplate against the refractor.

28. The method of claim 25 further comprising the step of forming on the contact surface of the switchplate a contact area for contacting the reflecting surface of the refractor, and wherein the contact area is a portion of the total area of the contact surface.

29. The method of claim 25 further comprising the step of forming curved surfaces on at least one of the contact surface of the switchplate and the reflecting surface of the refractor.

30. The method of claim 25 further comprising the steps of:

placing a conductive element on the switchplate;

affixing a conductive reference displaced from the conductive element; and wherein the conductive element and reference form a capacitor, the value of which represents the spacing between the switchplate and refractor.

31. The method of claim 25 further comprising the step of forming a convex refracting surface on the contact surface of the switchplate; for contacting the reflecting surface of the refractor.

32. The method of claim 25 further comprising the step of forming a convex refracting surface on the reflecting surface of the refractor for contacting the contact surface of the switchplate.

* * * * *